US007515583B2

(12) United States Patent
Kamani et al.

(10) Patent No.: US 7,515,583 B2
(45) Date of Patent: Apr. 7, 2009

(54) METHOD AND APPARATUS FOR PROVIDING A CONFIGURABLE QUALITY OF SERVICE THRESHOLD FOR VOICE OVER INTERNET PROTOCOL

(75) Inventors: Sejal Kamani, Glendale, AZ (US); Paul Coverdale, Nepean (CA); Chi Wong, Palo Alto, CA (US); Ben Kwong, San Jose, CA (US)

(73) Assignee: Nortel Networks Limited, St. Laurent (CA)

( * ) Notice: Subject to any disclaimer, the term of this patent is extended or adjusted under 35 U.S.C. 154(b) by 1099 days.

(21) Appl. No.: 10/810,467

(22) Filed: Mar. 26, 2004

(65) Prior Publication Data

US 2004/0179515 A1      Sep. 16, 2004

Related U.S. Application Data

(63) Continuation of application No. 09/219,682, filed on Dec. 23, 1998, now abandoned.

(60) Provisional application No. 60/104,908, filed on Oct. 20, 1998, provisional application No. 60/089,831, filed on Jun. 19, 1998, provisional application No. 60/090,075, filed on Jun. 19, 1998.

(51) Int. Cl.
*H04L 12/66* (2006.01)
*H04L 5/14* (2006.01)
*H04L 12/56* (2006.01)
*H04M 1/64* (2006.01)
*G06F 15/173* (2006.01)

(52) U.S. Cl. ............... 370/352; 370/230; 370/395.21; 370/401; 379/88.17; 709/238

(58) Field of Classification Search ............... 370/352, 370/400–401, 230–235, 395.5–395.53; 379/88.17, 379/265.01–265.06, 900; 709/223–226, 709/238–244, 249
See application file for complete search history.

(56) References Cited

U.S. PATENT DOCUMENTS 5,446,730 A      8/1995   Lee et al.

(Continued)

FOREIGN PATENT DOCUMENTS

EP             0 848 560 A2      6/1998

OTHER PUBLICATIONS

Catchpole A: "Voice-Data Convergence and the Corporate Voice-Over-IP Trial," British Telecommunications Engineering, GB, British Telecommunications Engineering, London, vol. 17., No. 4, pp. 218-224, XP000801951 ISSN: 0262-401X, Jan. 1999.

(Continued)

*Primary Examiner*—Tri H Phan
(74) *Attorney, Agent, or Firm*—Blakely Sokoloff Taylor & Zafman, LLP

(57) ABSTRACT

A method of connecting a telephone call through one of a plurality of networks where one of the plurality of networks is an internet protocol network is provided. A first factor for an acceptable quality of service level is received from a user. A second factor responsive to the quality of service for the internet protocol network is determined. The telephone call is connected through the internet protocol network if the second factor is greater than the first factor, otherwise, the telephone call is connected through one of the plurality of networks other than the internet protocol network.

26 Claims, 3 Drawing Sheets

U.S. PATENT DOCUMENTS

| | | |
|---|---|---|
| 5,726,984 A | 3/1998 | Kubler et al. |
| 5,898,668 A | 4/1999 | Shaffer |
| 5,898,673 A | 4/1999 | Riggan et al. |
| 5,995,606 A | 11/1999 | Civanlar et al. |
| 6,064,653 A | 5/2000 | Farris |
| 6,122,255 A | 9/2000 | Bartholomew et al. |
| 6,125,113 A | 9/2000 | Farris et al. |
| 6,154,445 A | 11/2000 | Farris et al. |
| 6,259,694 B1 | 7/2001 | Sato et al. |
| 6,259,695 B1 | 7/2001 | Ofek |
| 6,282,192 B1 | 8/2001 | Murphy et al. |
| 6,324,280 B2 | 11/2001 | Dunn et al. |
| 6,330,316 B1 | 12/2001 | Donak et al. |
| 6,335,927 B1 * | 1/2002 | Elliott et al. ................ 370/352 |
| 6,389,005 B1 | 5/2002 | Cruickshank |
| 6,449,259 B1 | 9/2002 | Allain et al. |
| 6,452,922 B1 * | 9/2002 | Ho ............................ 370/352 |
| 6,574,216 B1 * | 6/2003 | Farris et al. ................ 370/352 |
| 6,870,827 B1 * | 3/2005 | Voit et al. .................. 370/352 |
| 7,260,060 B1 * | 8/2007 | Abaye et al. ................ 370/230 |

OTHER PUBLICATIONS

ITU-U Recommendations G. 107, ITU Syudy Group 12 (1997-2000), 8 pages, published Geneva 1988.

ITU-Telecommunications Standardization Sector, one page, "Editorial Changes to New Rec. G. 107," Geneva, Nov. 24-Dec. 3, 1998.

* cited by examiner

METHOD AND APPARATUS FOR PROVIDING A CONFIGURABLE QUALITY OF SERVICE THRESHOLD FOR VOICE OVER INTERNET PROTOCOL

CROSS REFERENCE TO RELATED APPLICATIONS

This application is a continuation of application Ser. No. 09/219,682, filed Dec. 23, 1998, abandoned, which is incorporated herein by reference and which claims the benefit of U.S. Provisional Application No. 60/089,831, filed Jun. 19, 1998, which is incorporated herein by reference, of U.S. Provisional Application No. 60/090,075, filed Jun. 19, 1998, which is incorporated herein by reference, and of U.S. Provisional Application No. 60/104,908, filed Oct. 20, 1998, which is incorporated herein by reference.

BACKGROUND OF THE INVENTION

1. Field of the Invention

This invention relates to routing of telephone calls and, more particularly, to connecting of telephone calls over internet protocol networks.

2. Background Information

The traditional telephone network is a switched network that provides users with a dedicated end-to-end circuit for the duration of each call. Circuits are reserved between the originating switch, tandem switches (if any), and the terminating switch based on the called party number to create the end-to-end circuit.

Recently, telephone calls have been transmitted over digital networks using packet switched internet protocol (IP) networks, termed voice over IP (VoIP) transmission. Packet-switched IP networks provide shared, virtual circuit connections between users. Voice information to be transmitted across an IP network is converted into digital data and broken up into multiple, discrete packets. Individual packets may travel over different network paths to reach the final destination where the packets are reassembled in the proper sequence to reconstruct the original voice information. The transmission speed between any two users can change dramatically based on the dynamic number of users sharing the common transmission medium, their bandwidth requirements, the capacity of the transmission medium, and the efficiency of the network routing and design.

VoIP transmission typically costs less than transmission over traditional public switched telephone networks (PSTNs). A disadvantage of VoIP networks is the variability of the quality of the signal received at the destination as determined by changing network conditions. The received signal quality depends on a large number of variable network factors such as packet loss, packet latency, queuing delay, and bandwidth availability. These network factors will vary depending on the volume of network traffic and the location of the destination. The IP network, unlike the traditional public switched network, is not uniformly or predictably suitable for voice quality transmission.

Prior art systems that provide VoIP may monitor the quality of service (QoS) for voice transmissions and select alternate routing for calls when the QoS is determined to be unacceptable. However, QoS is a subjective determination. If the threshold level is too low, some users will have calls routed as VoIP when the QoS is unacceptable to the user. If the threshold level is too high, some users will have calls routed over more expensive lines when VoIP would be acceptable to the user.

The decision to route over IP or alternate routing is often a cost trade-off. The cost of alternate routing generally varies substantially depending on destination. Therefore, a QoS threshold that is suitable for a first destination may be too high for a second destination where the alternate routing is more expensive; the user may be willing to accept a lower QoS because of the higher cost of alternate routing. Similarly, the same QoS threshold could be too low where the alternate routing is less expensive.

The QoS requirement can vary depending on the type of call being transmitted. The QoS required for a teleconference is higher than that required for an automated voice response inquiry. In the case of the automated inquiry, the QoS requirement is different in each direction. The caller will transmit only control tones and a low QoS will be acceptable; the responder will transmit recorded voice and a higher QoS will be appropriate.

As pointed out above, QoS is affected by a large number of network factors. Typically, QoS thresholds are set as thresholds for one or more of the factors that affect quality. However, the factors interact in complex ways. A degradation in one factor can be offset by an enhancement of another factor. Setting thresholds for individual parameters to arrive at an appropriate QoS threshold is difficult. Further, setting thresholds for individual factors disregards the interaction between the factors. The QoS provided when all factors are above the threshold may also be available when one factor is below the threshold if other factors are sufficiently above the threshold.

The International Telecommunications Union (ITU) has issued recommendation G.107, The E-Model, A Computational Model for Use in Transmission Planing (Geneva 1998), that provides a transmission rating model, termed the E-model, for calculating a rating factor, R, based on a large number of terminal and network parameters which are known to impact the subjective perception of end to end voice quality. The recommendation also includes a guide for relating values of R to qualitative measures of voice quality transmission, including Mean Opinion Score (MOS). Higher values of R and MOS correspond to better voice quality and higher QoS. However, computation of R by the full E-model is complex and it is computationally wasteful to use it to compute R values for use in monitoring QoS in real-time.

Accordingly, what is required is a method and apparatus that permits the user to configure the QoS threshold for VoIP connection of calls. The method and apparatus should allow the threshold to be set based on the destination of the call being placed. Further, the method and apparatus should allow the threshold to be set based on an overall QoS desired rather than by setting thresholds for specific transmission parameters.

SUMMARY OF THE INVENTION

A method of connecting a telephone call through one of a plurality of networks where one of the plurality of networks is an internet protocol network is provided. A first factor for an acceptable quality of service level is received from a user. A second factor responsive to the quality of service for the internet protocol network is determined. The telephone call is connected through the internet protocol network if the second factor is greater than the first factor, otherwise, the telephone call is connected through one of the plurality of networks other than the internet protocol network.

DETAILED DESCRIPTION OF THE INVENTION

Figure 1:
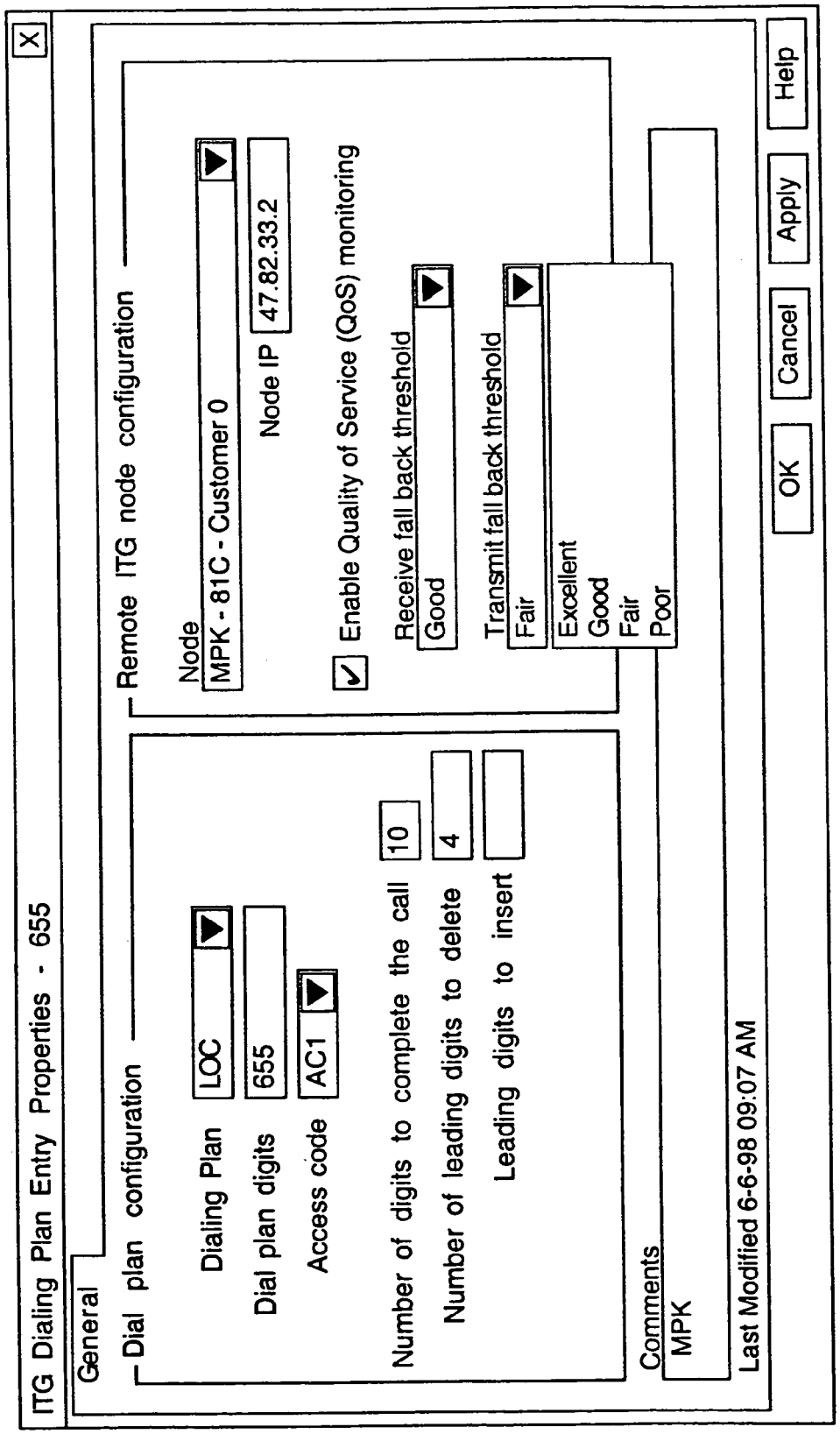
FIG. 1 shows a user screen for providing QoS thresholds.

The present invention provides a method and apparatus that permits the user to configure the quality of service (QoS) threshold for voice over internet protocol (VoIP) routing of calls. One embodiment of the invention allows the threshold to be set based on the destination of the call being placed. Another embodiment of the invention allows the threshold to be set based on an overall QoS desired rather than by setting thresholds for specific transmission parameters. A telephone call is connected through either an IP network or an alternate network based on a comparison of the user configured QoS threshold to the QoS being provided by the IP network to the call destination.

An additional aspect of the present invention is a method of generating a profile of quality of service levels in an IP network. The method comprises the steps of periodically transmitting data packets to selected IP addresses, calculating total one-way delay and packet loss for each selected IP address based on packets received back from the selected IP addresses, and calculating a transmission rating factor for each selected IP address based on the calculated total one-way delay and packet loss of the selected IP address.

As described herein, a user of a telephone routing system may select the level of acceptable voice quality before initiating a phone call. Based on the selection, the system automatically determines whether to complete the call using an internet protocol (IP) network or an alternate route such as a public switched telephone network (PSTN). The invention includes three major areas: user interface, network monitoring, and route selection. The user interface portion of the invention allows a user to establish the desired QoS to be provided by the system prior to placing a phone call. The network monitoring portion of the invention monitors the quality of service being provided by the IP network and maintains QoS information for use in connecting calls. The route selection portion of the invention receives the information about a call to be connected, the user supplied QoS parameters, and the network monitor QoS data, and determines if the call can be routed over the IP network.

The determination of whether voice quality is "acceptable" or "unacceptable" in an IP network is a subjective determination depending primarily on packet loss (for a given speech encoding scheme) and packet delay, which includes a fixed delay due to speech encoding and decoding and packetization, and a variable delay due to IP packet transport. In one embodiment of the invention, the user sets a maximum acceptable rate of packet loss and a maximum acceptable rate of packet delay. If either of these values is exceeded by the IP network, the call will not be routed through the IP network.

Setting individual thresholds for packet loss and packet delay leads to a non-optimum control of voice quality. For example, in some cases the voice quality may be dominated by high packet loss, in other cases by packet delay. A greater rate of packet loss may be acceptable when packet delay is low and vice-versa. Another embodiment of the invention allows the user to set QoS requirements using a subjective level of service rather than specific IP network parameters.

Preferably, the user selectable QoS levels are based on the ITU mean opinion score (MOS) and include "Excellent," "Good," "Fair," and "Poor." When the IP network is unable to deliver the selected level of quality or better, the call is routed through an alternate network such as the public switched telephone network (PSTN). In this embodiment of the invention, the network monitoring portion provides a calculated measure of MOS that can be compared to the user provided subjective requirement to determine call routing.

The user requirements for QoS may depend on the cost of using an alternate network. For example the incremental cost of routing a call over an alternate network might be lower for a call from California to New York than for a call from California to Japan. Accordingly, the user might have a lower call quality requirement for calls between California and Japan to allow a greater portion of those calls to be routed over the IP network. Likewise, the QoS might be set higher for calls between California and New York if the user is willing to pay the cost of using the alternate network rather than accepting lower call quality. In one embodiment, the present invention allows the user to set QoS requirements based on the destination of the call. For example, calls directed to a prefix where the cost of using the alternate network is low may be set to "excellent" or "good" call quality, while calls directed to a prefix where the cost of using the alternate network is high may be set to "fair" or "poor" signal quality.

Absolute voice quality requirements are different for different users. In addition, the user's expectation of voice quality and the trade-off between cost and quality may also be different for each user. In one embodiment of the invention, the user is able to set QoS requirements separately for each telephone line. In some applications such as integrated voice response (IVR), a higher level of service is needed in one direction than in the other. In IVR, the caller needs a better QoS for the voice responses, reception, than for the tone signaling, transmission. Another embodiment of the invention allows the user to determine QoS separately for transmission and reception. It should be noted that the caller controls the quality of the call in both directions. The Transmit and Receive QoS setting provides the flexibility to accommodate the asymmetric nature of the IP data network.

FIG. 1 illustrates a graphical user interface (GUI) for one embodiment of the invention that incorporates the above concepts for setting desired levels of service. A screen is shown that allows the dialing plan properties for the 655 prefix to be set. The portion of the screen labeled "Remote ITG node configuration" provides an IP node address that can connect calls directed to the 655 prefix. The present invention is operative when "Enable Quality of Service (QoS) monitoring" is checked. The user is able to set a "Receive fall back threshold" and a "Transmit fall back threshold." As shown for the "Transmit fall back threshold," the user selects the threshold from "Excellent," "Good," "Fair," and "Poor." Although "user," as discussed above, is used in the context of a technician or craftsperson, concepts consistent with the present invention could equally be applied to allow the person dialing the telephone calls to select the level of quality before dialing each call. For example, the caller could enter a dialed code that overrides the predetermined quality settings for the next call placed.

The network monitor portion of the invention maintains IP network statistics that are compared to the user quality requirements to make call routing decisions. Statistics are maintained for all the quality categories provided by the user. In the embodiment where the user sets QoS as maximum packet loss and maximum packet delay for each telephone line, for both transmission and reception, based on call destination, the network monitor will maintain statistics for packet loss and packet delay for transmission and reception to all configured destinations. Note that the per telephone line QoS settings do not affect the network monitoring requirements.

Figure 2:
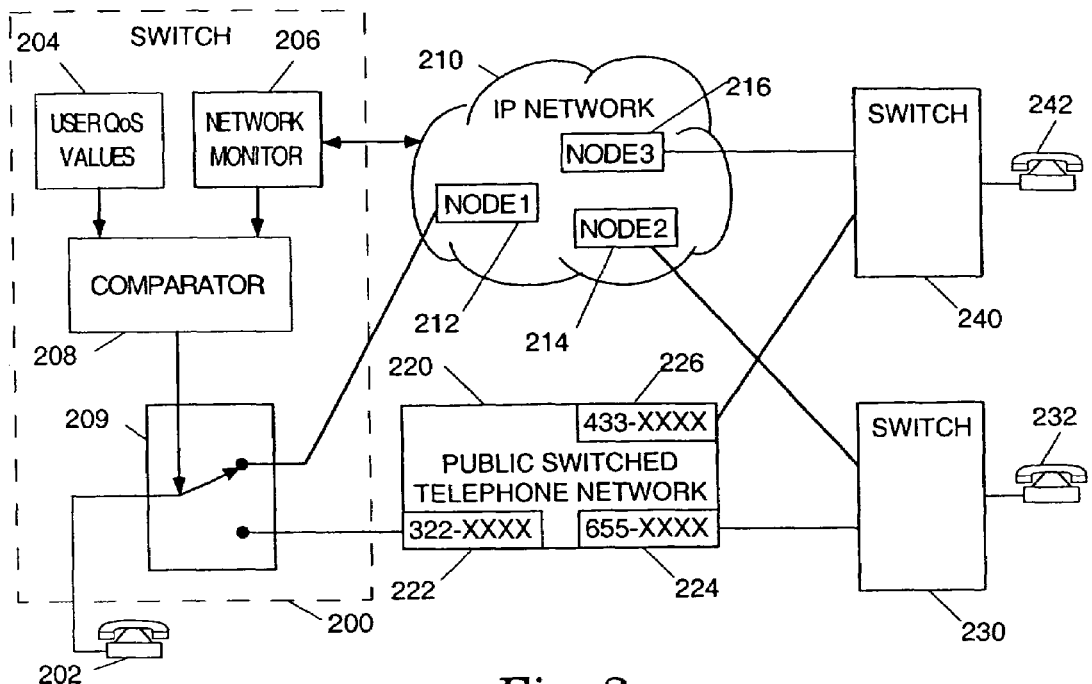
FIG. 2 shows a telephone system using an embodiment of the invention.

FIG. 2 shows a telephone system that includes an embodiment of the invention. The system includes three local switches 200, 230, 240 that provide connections for callers 202, 232, 242, who are at three different geographic locations. Each switch 200, 230, 240 can connect to any other switch through the IP network 210 or through the public switched telephone network (PSTN) 220. A call placed by a first caller 202, through a first switch 200 to a second caller 232 through a second switch 230 can be connected through the IP network 210 or through the PSTN 220.

A network monitor 206 in the first switch 200 periodically polls the destination nodes 214, 216 of the IP network 210 to determine the total one-way delay, Ta, and percent packet loss for transmissions between the local switch 200 and each defined destination switch 230, 240 reachable through the IP network 210. A table of user defined QoS parameters 204 is maintained by the switch 200. When the user 202 places a call, the switch 200 determines which of the IP nodes 214, 216 can complete a call to the dialed number. For example, a call to "655-XXXX" can be completed through node 2 214 on the IP network 210. The switch then retrieves the user QoS values 204 associated with the 655 prefix from the table 204 and the network QoS statistics associated with node 2 214 from the network monitor 208. A comparator 208 determines if the network QoS statistics 206 show a QoS for the IP network 210 that is above the user determined threshold 204. If the QoS is above the threshold 204, then the call is completed though the IP network 210 by a network selector 209; otherwise, the call is routed through an alternate network such as the PSTN network 220.

In the embodiment where the user sets quality requirements 204 with subjective quality levels, the network monitor 206 must calculate a composite factor that reflects the subjective level of service being provided by the IP network 210 to be compared to a value 204 based on the subjective user requirements. ITU recommendation G.107 provides a method for calculating an R value, termed the E-Model, that provides a numeric value for predicting user satisfaction with voice quality for call connected through an IP network. The recommendation relates subjective levels of service to qualitative measures of voice quality as shown in Table I. The recommendation also provides the following formula to relate R values to a numeric MOS value, for 0<R<100:

$$MOS = 1 + 0.035R + R(R-60)(100-R)7 \times 10^{-6}$$

TABLE I

| R value lower limit | MOS lower limit | GOB % lower limit | POW % upper limit | User satisfaction |
|---|---|---|---|---|
| 90 | 4.34 | 97 | −0 | Very satisfied |
| 80 | 4.03 | 89 | −0 | Satisfied |
| 70 | 3.60 | 73 | 6 | Some users dissatisfied |
| 60 | 3.10 | 50 | 17 | Many users dissatisfied |
| 50 | 2.58 | 27 | 38 | Nearly all users dissatisfied |

R value lower limit is the lowest value of R that will provide the indicated level of user satisfaction. MOS lower limit is the corresponding value on the MOS scale. GOB % lower limit is the percentage of listeners who would be expected to rate call quality as "good" or better at the given R value. POW % upper limit is the percentage of listeners who would be expected to rate call quality as "poor" or worse at the given R value. "Good" and "poor" are evaluated on the five step qualitative MOS scale.

The present invention provides a simplified version of the ITU E-Model for calculating R on a real-time basis by the network monitor 206. The E-Model determines the combined effect of packet loss, packet latency and the speech coding algorithm (compression/decompression algorithm) on voice quality. The simplified E-Model calculates R as:

$$R = 94.15 - (Idd + Ie)$$

where, for Ta<100 ms:

$$Idd = 0$$

and for Ta>100 ms:

$$Idd = 25\{(1+X^6)^{1/6} - 3[1+(X/3)^6]^{1/6} + 2\}$$

in which: $X = \dfrac{\log(Ta/100)}{\log 2}$

Ta is the total one-way delay resulting from speech coding packetization, buffering IP routing queuing and propagation, etc. As discussed above, Ta for the destination nodes 232, 242 is periodically measured by the network monitor 206. Methods of determining Ta in an IP network are known. For example, Ta between two modes may be physically measured by sending a test packet to the destination node. The destination node time stamps the received packet and sends it back. The receiving node can then directly measure Ta based on the time stamp and the reception time of the returned packet.

Figure 3:
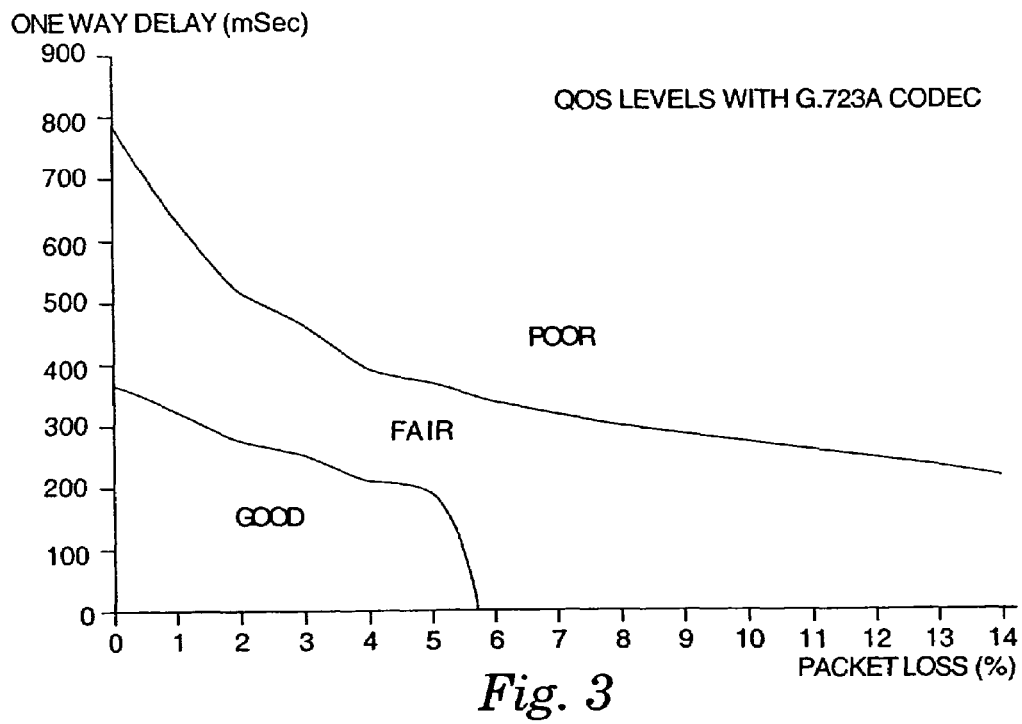
FIG. 3 shows the QoS levels as determined by the simplified E-Model for a G.723.1 codec.
Figure 4:
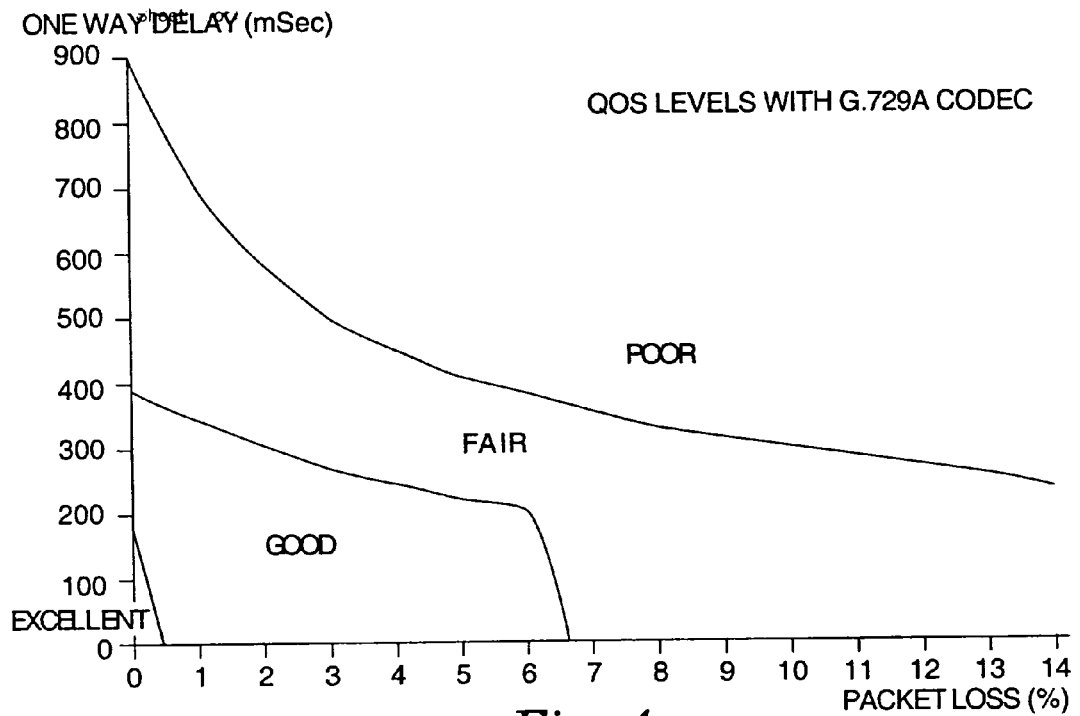
FIG. 4 shows the QoS levels as determined by the simplified E-Model for a G.729A codec.
Figure 5:
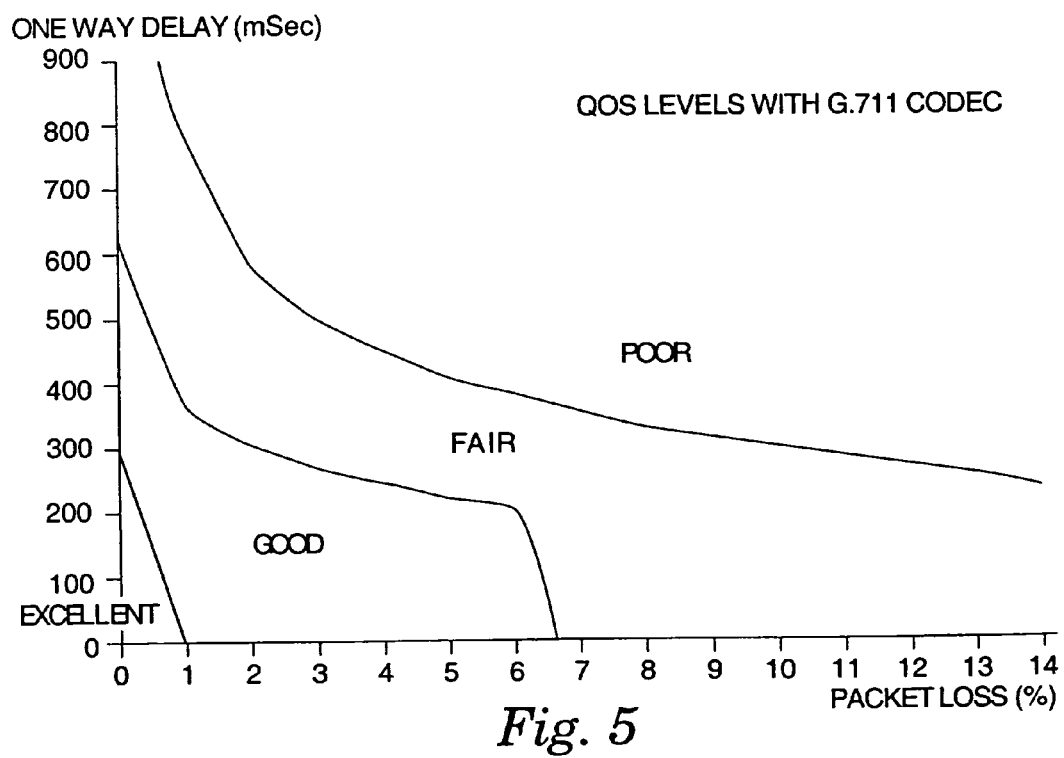
FIG. 5 shows the QoS levels as determined by the simplified E-Model for a G.711 codec.

Ie is the impairment factor due to low bit-encoding and packet loss on the IP network. Ie is preferably calculated using conventional subjective listening carried out on the speech coders being used, generally following the standard procedures in ITU-T recommendation P.830. Values of Ie were obtained from the results of these tests following the procedure given in ITU-T recommendation G.113 Annex E. Table II, below, lists exemplary values of Ie for three different codec types, G.723.1, G.729A and G.711. FIGS. 3-5 show typical relationships between packet loss, packet latency, and QoS for three exemplary codecs as determined by the simplified E-model of the present invention. The illustrative boundary lines shown are based on the exemplary threshold values given in Table II.

TABLE II

| Codec % Packet Loss | G.723.1 | G.729A | G.711 |
|---|---|---|---|
| | Value of Ie from experimental data | | |
| 0 | 15 | 13 | 0 |
| 1.0 | 19 | 17 | 15 |
| 2.0 | 24 | 21 | 21 |
| 3.0 | 27 | 25 | 25 |
| 4.0 | 32 | 28 | 28 |
| 5.0 | 34 | 31 | 31 |
| 6.0 | 37 | 33 | 33 |
| 8.0 | 41 | 38 | 38 |
| 13.0 | 49 | 46 | 46 |
| 14.0 | 51 | 48 | 48 |
| 15.0 | 53 | 49 | 49 |
| 16.0 | 55 | 51 | 51 |

In one embodiment, the network monitor 206 periodically calculates an R value for each communication path formed by the destination nodes 212, 214 using the simplified E-Model described above. The subjective user values 204 are stored as the related R values as shown in Table III. The comparator 208 compares the R value being provided by the network 206 to the desired R value 204 derived from the user's subjective quality threshold to determine if the call can be connected through the IP network 210. In FIGS. 3-5, a call will be connected through the IP network 210 when the packet loss and packet latency being provided by the IP network intersect at a point that is below and to the left of the boundary for the subjective MOS as set by the user for the codec being used. Note that for a G.723.1 codec (FIG. 3) a quality requirement of "excellent" will result in no calls being routed through the IP network when the threshold values of Table III are used. When the quality requirement is "poor" all calls are routed through the IP network based on the threshold values of Table III.

TABLE III

| Subjective MOS | Connect via IP network if MOS is above | Connect via IP network if R value is above |
|---|---|---|
| Excellent | 4 | 79.3 |
| Good | 3 | 58.0 |
| Fair | 2 | 38.6 |
| Poor | 1 (always use IP network) | 0 (always use IP network) |

In another embodiment, the network monitor 206 further calculates an MOS value using the ITU formula given above from the R value. The comparator compares the MOS being provided by the network 206 to the desired MOS 204 derived from the user's subjective quality threshold, as shown in Table III, to determine if the call can be connected through the IP network 210.

The system discussed above is preferably implemented at the transmitting and receiving end, by a computer or a network of computers coupled to both an IP network and a public switched network. Methods consistent with the present invention, as discussed above, may be implemented as computer software within the computers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of connecting a telephone call from a user through one of a plurality of networks where one of the plurality of networks is an internet protocol network, comprising:
    determining a destination of the telephone call;
    setting a first transmission factor and a first reception factor according to a predetermined minimum quality of service level requirement based on the destination of the telephone call;
    receiving a second transmission factor and receiving a second reception factor responsive to the quality of service provided by the internet protocol network; and
    connecting the telephone call through the internet protocol network if the second transmission factor is greater than the first transmission factor and the second reception factor is greater than the first reception factor, otherwise, connecting the telephone call through one of the plurality of networks other than the internet protocol network.

2. A method of connecting a telephone call through one of a plurality of networks where one of the plurality of networks is an internet protocol network, comprising:
    receiving a threshold value;
    calculating a rating factor for the internet protocol network by subtracting a first value and a second value from a constant value,
    where the first value is 0 if the total one-way delay is less than 100 milliseconds, and, otherwise, the first value is calculated according to the following equation, in which $Ta$ is the total one-way delay:

$$25\left\{\left[1+\left(\frac{\log(Ta/100)}{\log 2}\right)^6\right]^{1/6} - 3\left[1+\left(\frac{\log(Ta/100)}{3\log 2}\right)^6\right]^{1/6} + 2\right\}$$

where the second value is an empirical value derived from subjective measurements for a type of codec and the percentage of loss of data packets, and
   where the constant value is a value between about 80 and about 100; and
   connecting the telephone call through the internet protocol network if the rating factor is greater than the threshold value, otherwise, connecting the telephone call through one of the plurality of networks other than the internet protocol network.

3. The method of claim 2 where the received threshold value is responsive to a destination of the telephone call.

4. The method of claim 2 where:
    receiving the threshold value further comprises receiving a transmission threshold value and a reception threshold value;
    calculating the rating factor further comprises calculating a transmission rating factor and calculating a reception rating factor; and
    connecting the telephone call further comprises connecting the telephone call through the internet protocol network if the transmission rating factor is greater than the transmission threshold value and the reception rating factor is greater than the reception threshold value, otherwise, connecting the telephone call through one of the plurality of networks other than the internet protocol network.

5. The method of claim 2 where receiving the threshold value further comprises receiving a desired quality level from a user, and producing a threshold value responsive to the desired quality level.

6. The method of claim 5 where the desired quality level is chosen from a plurality of quality levels comprising a first quality level and a second quality level where the first quality level is a higher level of quality than the second quality level.

7. The method of claim 6 where the threshold value is at least seventy-five percent of a maximum threshold value if the desired quality level is the first quality level, and a value between fifty-five percent and seventy-five percent of the maximum threshold value if the desired quality level is the second quality level.

8. The method of claim 7 where the plurality of quality levels further comprises a third quality level of a lower level of quality than the second quality level and where the threshold value is a value between thirty-five percent and fifty-five percent of the maximum threshold value if the desired quality level is the third quality level.

9. The method of claim 8 where the plurality of quality levels further comprises a fourth quality level of a lower level of quality than the third quality level and where the telephone call is always connected through the internet protocol network if the desired quality level is the fourth quality level.

10. The method of claim 2 where the constant value is about 94.

11. An apparatus for routing a telephone call from a user received on a line, through one of a plurality of networks where one of the plurality of networks is an internet protocol network, comprising:
 a control connected to the line that sets a first transmission factor and a first reception factor according to a predetermined minimum quality of service level requirement based on the destination of the telephone call;
 a network monitor connected to the internet protocol network, that generates a second transmission factor and a second reception factor responsive to the quality of service provided by the internet protocol network;
 a comparator connected to the user control and the network monitor, that compares the first transmission factor to the second transmission factor and the first reception factor to the second reception factor; and
 a switch connected to the comparator, the line, and the plurality of networks, that connects the line to the internet protocol network if the second transmission factor is greater than the first transmission factor and the second reception factor is greater than the first reception factor, otherwise, to one of the plurality of networks other than the internet protocol network.

12. An apparatus for routing a telephone call received on a line, through one of a plurality of networks where one of the plurality of networks is an internet protocol network, comprising:
 a control that receives a threshold value;
 a network monitor connected to the internet protocol network, that calculates a rating factor for the internet protocol network by subtracting a first value and a second value from a constant value,
 where the first value is 0 if the total one-way delay is less than 100 milliseconds, and, otherwise, the first value is calculated according to the following equation, in which Ta is the total one-way delay:

$$25\left\{\left[1+\left(\frac{\log(Ta/100)}{\log 2}\right)^6\right]^{1/6} - 3\left[1+\left(\frac{\log(Ta/100)}{3\log 2}\right)^6\right]^{1/6} + 2\right\}$$

where the second value is an empirical value derived from subjective measurements for a type of codec and the percentage of loss of data packets, and
 where the constant value is a value between about 80 and about 100;
 a comparator connected to the control and the network monitor, that compares the threshold value to the rating factor; and
 a switch connected to the comparator, the line, and the plurality of networks, that connects the line to the internet protocol network if the second factor is greater than the first factor, otherwise, to one of the plurality of networks other than the internet protocol network.

13. The apparatus of claim 12, where the received threshold value is responsive to a destination of the telephone call.

14. The apparatus of claim 12, where:
 the control further receives a transmission threshold value and a reception threshold value;
 the network monitor further calculates a transmission rating factor and calculating a reception rating factor; and
 the switch further connects the telephone call through the internet protocol network if the transmission rating factor is greater than the transmission threshold value and the reception rating factor is greater than the reception threshold value, otherwise, connecting the telephone call through one of the plurality of networks other than the internet protocol network.

15. The apparatus of claim 12, where the control further receives a desired quality level from a user, and producing a threshold value responsive to the desired quality level.

16. The apparatus of claim 15, where the desired quality level is chosen from a plurality of quality levels comprising a first quality level and a second quality level where the first quality level is a higher level of quality than the second quality level.

17. The apparatus of claim 16, where the threshold value is at least seventy-five percent of a maximum threshold value if the desired quality level is the first quality level, and a value between fifty-five percent and seventy-five percent of the maximum threshold value if the desired quality level is the second quality level.

18. The apparatus of claim 17, where the plurality of quality levels further comprises a third quality level of a lower level of quality than the second quality level and where the threshold value is a value between thirty-five percent and fifty-five percent of the maximum threshold value if the desired quality level is the third quality level.

19. The apparatus of claim 18, where the plurality of quality levels farther comprises a fourth quality level of a lower level of quality than the third quality level and where the telephone call is always connected through the internet protocol network if the desired quality level is the fourth quality level.

20. The apparatus of claim 12, where the constant value is about 94.

21. A method of connecting a telephone call from a user through one of a plurality of networks where one of the plurality of networks is an internet protocol network, comprising:
 receiving a first transmission factor from the user to set a minimum transmission quality of service level;
 receiving a first reception factor from the user to set a minimum reception quality of service level;
 receiving a second transmission factor responsive to the transmission quality of service provided by the internet protocol network;
 receiving a second reception factor responsive to the reception quality of service provided by the internet protocol network; and
 connecting the telephone call through the internet protocol network if the second transmission factor is greater than the first transmission factor and the second reception factor is greater than the first reception factor, otherwise, connecting the telephone call through one of the plurality of networks other than the internet protocol network.

22. The method of claim 21, where the first transmission factor and the first reception factor are responsive to a destination of the telephone call.

23. The method of claim 21, where the first transmission factor and the first reception factor are chosen from a plurality of subjective quality of service levels.

24. An apparatus for routing a telephone call from a user received on a line, through one of a plurality of networks where one of the plurality of networks is an internet protocol network, comprising:
 a user control that receives a first transmission factor from the user to set a minimum transmission quality of service level, and receives a first reception factor from the user to set a minimum reception quality of service level;

a network transmission monitor connected to the internet protocol network, that generates a second transmission factor responsive to the transmission quality of service provided by the internet protocol network;

a network reception monitor connected to the internet protocol network, that generates a second reception factor responsive to the reception quality of service provided by the internet protocol network;

a comparator connected to the user control and the network monitor, that compares the first factor to the second factor; and a switch connected to the comparator, the line, and the plurality of networks, that connects the line to the internet protocol network if the second transmission factor is greater than the first transmission factor and the second reception factor is greater than the first reception factor, otherwise, to one of the plurality of networks other than the internet protocol network.

25. The apparatus of claim 24, where the first factor is responsive to a destination of the telephone call.

26. The apparatus of claim 24, where the first factor is chosen from a plurality of subjective quality of service levels.

* * * * *